P. H. DOHERTY.
SPEED CHANGER.
APPLICATION FILED AUG. 25, 1908.
950,317.
Patented Feb. 22, 1910.
3 SHEETS—SHEET 3.
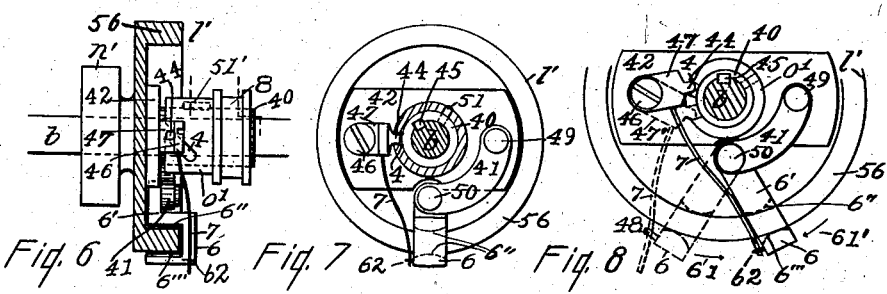
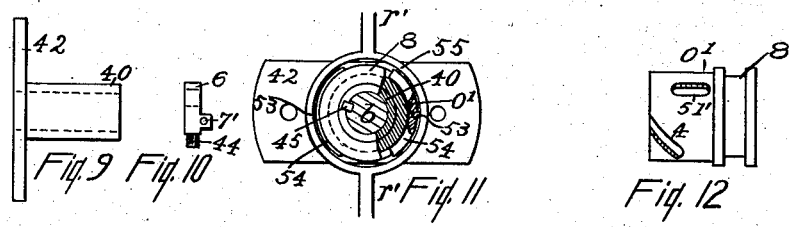
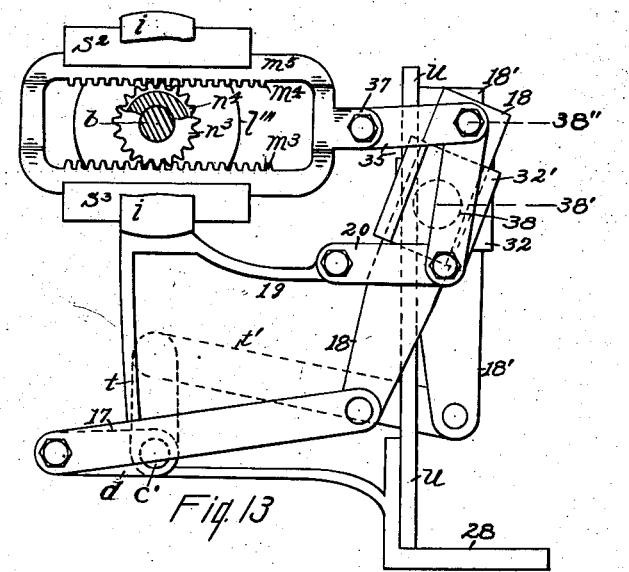
WITNESSES:
INVENTOR
Patrick H. Doherty
BY
ATTORNEY

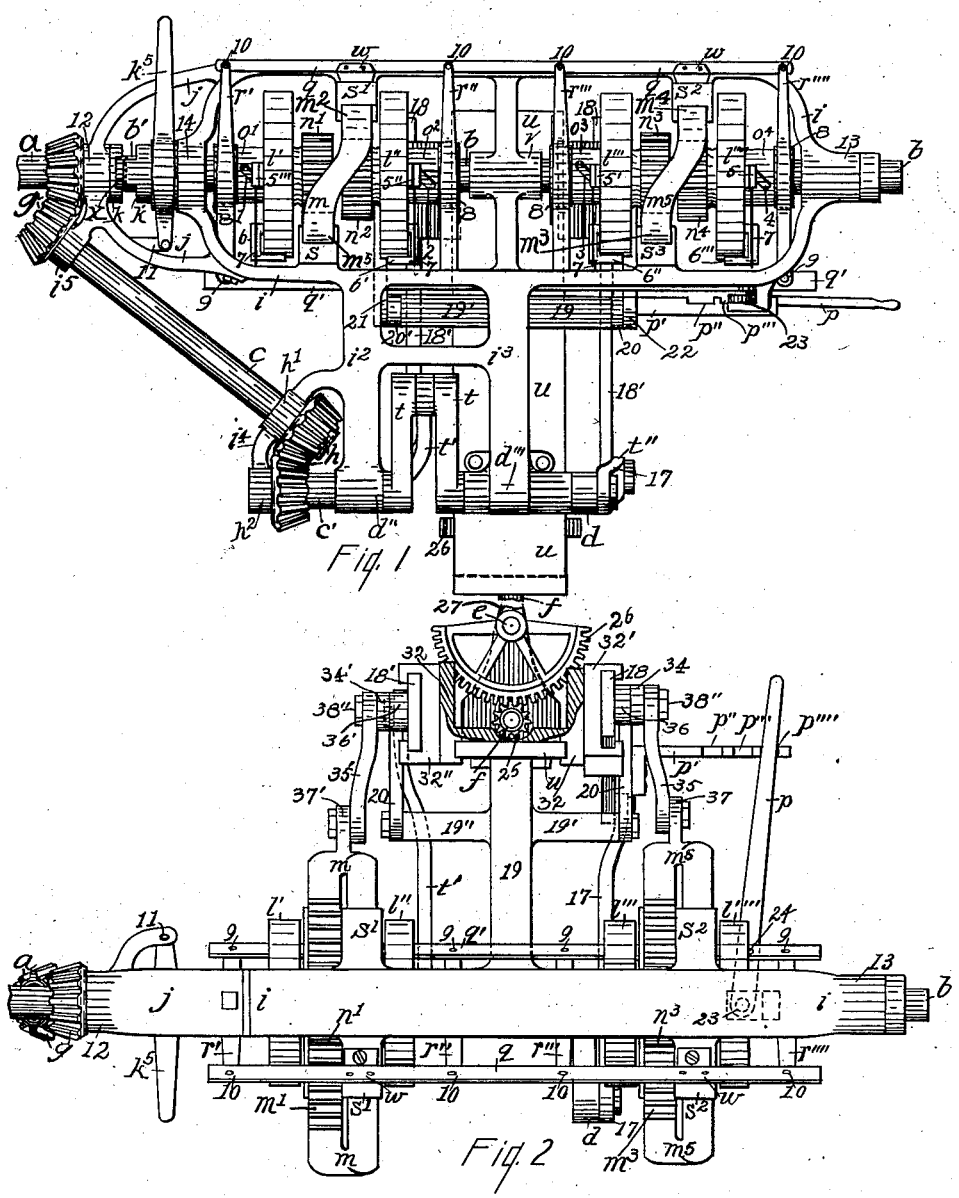

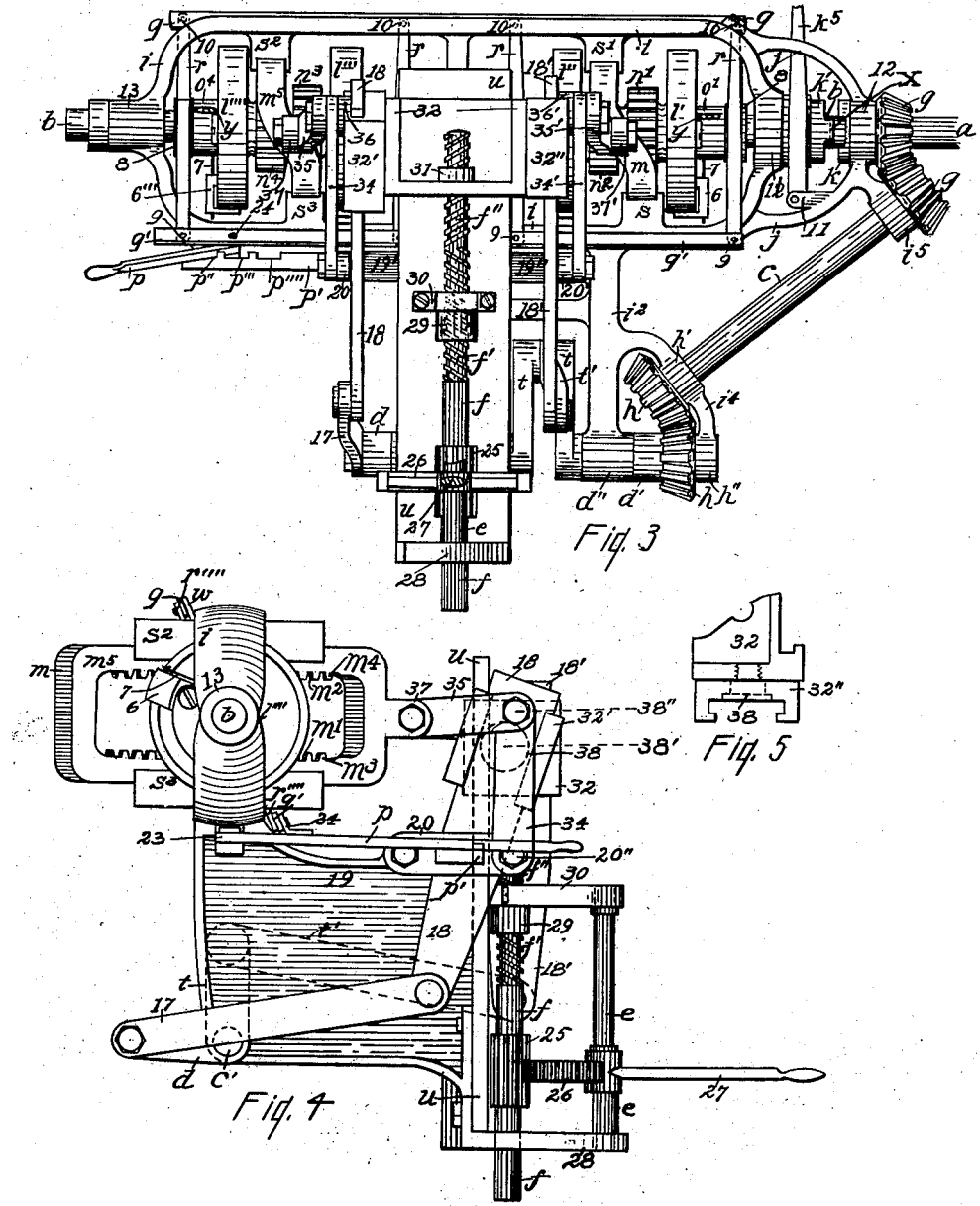

UNITED STATES PATENT OFFICE.

PATRICK H. DOHERTY, OF PEEKSKILL, NEW YORK.

SPEED-CHANGER.

950,317.  Specification of Letters Patent.  Patented Feb. 22, 1910.

Application filed August 25, 1908. Serial No. 450,161.

*To all whom it may concern:*

Be it known that I, PATRICK H. DOHERTY, a citizen of the United States, and resident of Peekskill, in the county of Westchester and State of New York, have invented a certain new and useful Speed-Changer, of which the following is a specification.

This invention relates to the transmission of power in automobiles, high speed engines in boats, and all like machinery where a variable speed is required; and its object is to effect the changes of speed without the throwing in and out of gearing. The object is attained by the means set forth in these specifications and the accompanying drawings.

Figure 1 is a front elevation of the speed changer. Fig. 2 is a plan of the combination. Fig. 3 is a front elevation, and Fig. 4 an end elevation of the speed changer, of that end which is opposite the angle gearing. Fig. 5 is a detail relating to the sliding and vibrating heads. Fig. 6 is a part of the main shaft rotating mechanism, partly in cross-section. Fig. 7 is a front view of the parts shown in Fig. 6. Fig. 8 is an enlarged detail to show the action of the rotating dog. Fig. 9 is a view of a flanged hub. Fig. 10 is an edge view of a spring controlling lever. Fig. 11 is a side view of the flanged hub shown in Fig. 9 with a clutch shown partly in cross section. Fig. 12 is a perspective view of a slotted sleeve. Fig. 13 is a partially transverse section explanatory of the operation of several parts of the combination.

Like letters and numbers refer to similar parts throughout the several views.

Figs. 1, 2, 3, 4, show that the frame for this mechanism comprises an oval part $i$, hangers $i^2$ $i^3$ depending from the oval frame and the part $i^3$ extended at right angles to the oval forming a solid support 19 for a vertical flat bar $u$. To one end of the frame $i$ an extension $j$ is secured. The frame thus constituted contains four bearings 12, 13, 14, $v$, for shafts $a$ and $b$ $b$.

$a$ Fig. 1 represents an end of the engine shaft, and it extends through the bearing 12, through coupling $k$ to the broken line $x$, Figs. 1 and 3. A shaft $b$ $b$ extends in line with the engine shaft through the bearings 14, $v$, 13, and this shaft carries elements for effecting its rotation.

A crank-shaft $c'$, Figs. 1 3 4, parallel with the main shaft $b$ $b$ is supported in the bearings $d''$ $d'''$, the cranks $t$ and $y$ being set at right angles one to the other, as clearly shown in Fig. 4. An extension hanger $i^4$ projects from the hanger $i^2$, Figs. 1 and 3, providing a bearing $h'$ for a shaft $c$, and a bearing $h^2$ for the end of the crank-shaft. A bearing $i^5$ from the frame $j$ supports the upper end of the shaft $c$. Angle gearing $h$ $g$ transmit motion from the engine shaft $a$ to the crank-shaft. Turning the engine shaft $a$ imparts motion to the crank-shaft, and through levers and connections to be described, the crank-shaft transmits motion to the devices on the main shaft $b$ $b$, the engine shaft thus indirectly giving motion to the main shaft. Within the frame $j$ is a coupling $k$ $k'$ divided between the shafts $a$ and $b$ $b$. The part $k'$ of the coupling is operated by means of a lever $k^2$ that is fulcrumed to the frame $j$ at the point 11. When this coupling is closed the shaft $a$ transmits its motion directly to the shaft $b$ $b$.

Upon the shaft $b$ $b$ there are four pulleys $l'$ $l''$ $l'''$ $l''''$, and each of the pulleys has secured to it, or has integral with it, a spur gear wheel, the wheel $n^1$ being a part of the pulley $l'$, $n^2$ of $l''$, $n^3$ of $l'''$, and $n^4$ of $l''''$. These united pulleys and gear wheels are disposed in pairs, so as to be operated by the double or looped racks $m$ $m^5$, Figs. 1 2 3 4, the racks in each loop occupying different vertical planes that they may engage with their respective gear wheels as shown in Figs. 1 2, where it will be seen that the lower rack $m^1$ of the loop $m$ engages with the wheel $n^1$, the upper rack $m^2$ engaging with the wheel $n^2$, and the lower rack $m^3$ of the loop $m^5$ engages with the wheel $n^3$ and the upper rack $m^4$ with the wheel $n^4$. The rack loops are supported in grooved frame extension $s$ $s^1$ $s^2$ $s^3$, Figs. 1, 2, 3, 4, 13. The racks have a reciprocating motion, oscillating their respective gear wheels backward and forward. They do not move in unison but in accordance with the right angled cranks of the crank-shaft $c'$, from which the racks derive their motion. As the racks impart to their respective gear wheels an oscillating motion only the gear wheels might be sectors instead of complete wheels. It is through the action of these racks upon the gear wheels that the main shaft is rotated, and the speed of rotation is governed by the range between the maximum and minimum strokes of the racks, and one of the main features of the device is the means for controlling the length of the movement of the racks, which means will now be described.

Referring particularly to Figs. 2 3 4, the vertical bar $u$ is provided with a sliding head 32, and this head may be raised and lowered by means of the double-threaded screw $f'\ f''$ which is a part of the shaft $f$, and is turned by means of the pinion 25 on the shaft, and the sector 26, mounted on the shaft $e\ e$ and provided with a hand lever 27. A bracket 28 provides bearings for the lower ends of the shafts $f$ and $e\ e$, and a second bracket 30 (Fig. 4) provides a bearing for the upper end of the shaft $e\ e$, a hub 29 on the same bracket being threaded to receive the screw $f'$. A hub 31 on the head 32 is threaded to receive the screw $f''$. The two screws $f'\ f''$ are of coarse and of opposite pitch, and the effect of turning the screw is to move the head twice the vertical movement of the screw. As the screw and shaft have a vertical movement the pinion is given a length equal to that movement to prevent it disengaging from the sector. The lower end of the shaft extends an equal length through its bearing in the bracket 28. In Fig. 2 the head 32 and bracket are shown as cut away to reveal the plan of the shafts $e$, $f$, pinion 25 and sector 26.

Upon the two sides of the head 32 are vibrating heads 32' 32'' pivoted to the head 32 as shown particularly in Fig. 5, in which the head 32'' will swing freely on the stud 38. These side heads are grooved to receive the levers 18 18' as in Figs. 2 3 and particularly in Fig. 4. The upper ends of the levers 18 18' are connected with the looped racks $m\ m'$ by the links 35 35'. Stationary links or brackets 20 20', rigidly secured to the arms 19' 19'' (Figs. 2 and 3) afford pivotal bearings 20'' (Fig. 4) for the lower ends of the links 34 34', and the upper ends of said links are joined on the pivots 38'' that unite the links 35 35' to the levers 18 18'. The effect is to admit of horizontal movement of the pivot 38'', but otherwise their positions are held unchangeable by the links 34 34'. The lower end of the lever 18 is connected with the crank $y$ by a connecting bar 17 (Fig. 4), and the lever 18' is connected with the crank $t$ by the connecting bar $t'$.

The pivot 38', Fig. 4, is the fulcrum upon which the lever 18 vibrates. If the head 32 is raised so as to bring the center of the pivots 38' 38'' in the same horizontal plane, obviously no movement can be imparted to the rack loops $m\ m'$ by the movement of the crank-shaft. But if the head 32 is lowered to the position shown, then the change of position of the two centers 38' 38'' will give a length of lever above the center 38'' that will produce a movement of the rack loop. If the head 32 be still further lowered as in Fig. 13 the leverage above the center 38'' is increased and a correspondingly greater movement is imparted to the rack loops. So that the position of the head 32 determines the travel of the racks, and this position is controlled by manipulation of the hand-lever 27 (Fig. 4).

Fig. 13 clearly illustrates the connections between the crank shaft and the rack loops $m\ m^5$, through which a reciprocating movement is given to the racks. For clearness a single loop $m^5$ is shown, with sections of the gear-wheels $n^3\ n^4$ that are acted upon by the racks $m^3\ m^4$. The wheel $n^3$ is a part of the pulley $l'''$, and the wheel that would be a part of the wheel $n^4$ is omitted. The manner in which the pulleys transmit this movement to the shaft will now be described.

A description of one of the pulleys $l'\ l''\ l'''\ l''''$ will apply to the four, as they and their attachments are all alike, except that two may be called right hand and two left hand. The pulley is recessed on the side opposite the gear wheel as shown particularly in Figs. 6 7 8, giving to the pulley a thick rim 56. Extending within this rim is a hub 40 with a flange 42, shown separately in Fig. 9, and in position in Figs. 6 7 8. The front views of the flange show that it is made to carry a short lever 47 and a link 41 that supports a dog 6. The hub 40 is fastened on the shaft $b$ by a key 45, it being remembered that the gear wheel and pulley are loose on the shaft. The dog 6 has its outer end notched to fit freely over the rim of the wheel. It swings on the pivot 50 in the link 41, the link swinging on the pivot 49 in the flange. The inner surfaces of the dog which embrace the wheel rim 56 are curved as by the broken lines 6'', in Figs. 7 8, and are adapted to pinch against the wheel rim when the dog is thrown out of the vertical position shown in Fig. 7.

Referring to Fig. 8, if the dog lies in the position shown by solid lines and the rim 56 moves in the direction of the arrow 61' no movement of the dog will result; but if the rim moves in the direction of the arrow 61' the jaws of the dog will pinch upon the rim and will be carried, and will carry the flanged hub and shaft as far as the wheel rim is carried. If the dog be placed in the position of the broken lines, the action of the dog will be reversed, and it will move with the rim when the rim moves in the direction of the arrow 61'. No movement of the rim in either direction will affect the dog when it is in the position shown in Fig. 7.

The means of changing the positions of the dog are as follows: A short lever 47, Figs. 6 7 8, particularly, is pivoted at 46 to the flange 42. A spring 7 is secured in this lever which is attached to the dog by means of a hook or staple 62, not rigidly, but so that the spring may slide freely through the staple. An edge view of the lever is shown in Fig. 10, 7' showing where the spring 7 is secured to it. The lever has a point 44, which may have a diagonal shape to conform to the slot in which it projects, but it is here shown as rounded. The point projects into the diagonal slot 4 in the sleeve $o^1$, the slotted sleeve being shown separately in Fig. 12. The sleeve slides freely on the hub 40, but is kept from turning on the sleeve by means of a pin 51, Figs. 7 8, fast in the hub and projecting through the slot 51', shown clearly in Fig. 12. Sliding the sleeve $o^1$ on the hub 40 operates to change the position of the dog through the spring 7, as in Fig. 8. For thus sliding the sleeve $o^1$ means are shown in Figs. 1 2 and 3. The sleeve in Fig. 12 shows a groove 8 in one end thereof, and Fig. 11 shows that within the groove are ordinary coupling jaw-pieces 54 that are pivoted at 53 to an encircling lever $r'$. Each of the sleeves $o^1$ thus have a lever adapted to move them, as at $r'$ $r''$ $r'''$ $r''''$, Figs. 1 2 3 4. One end of each of the levers is pivoted at 10 to a bar $q$ secured to the frame, as at $w$ $w$, Figs. 1 2 4, and the lower ends of the levers are pivoted to a shifting bar $q'$, at 9. A hand lever $p$ fulcrumed to the frame at 23, is pivoted to the bar $q'$ at 24, best shown in Fig. 4. A fixed arm $p'$ (Figs. 2 and 3) supports the outer end of the hand-lever and is provided with three notches $p''$ $p'''$ $p''''$, in which the hand lever has lodgment. The middle notch is a neutral position, the lever in notch $p''$ will cause the shaft to revolve forward, while dropping the lever in the notch $p''''$ will cause a reversal of the movement of the shaft.

The maximum stroke of the racks will cause a one-fourth revolution of the pulleys, so that four strokes of the rack will be required to cause a full revolution of the pulley and consequently of the shaft $b$. If the stroke of the racks be shortened one-half, double the number of strokes of the racks will be required to turn the wheel or pulley one revolution, and the shaft will revolve with one-half its first speed; so that, as the strokes of the racks decrease in length, the speed of the shaft decreases, and thus the speed of the shaft is governed by the strokes of the racks. As there are four pulleys operating to turn the shaft at least one of them is always in action.

When the lever $p$ rests in the notch $p'''$ in the arm $p$, and the lever 27 is carried to the left causing the pivot 38' in the head 32 to be coincident with the pivot 38'', the only parts of the combination described that will be in motion when the engine is running will be the shaft $a$, the shafts $c$ $c'$, and the levers 18 18' which latter will have a swing imparted to them by the crank shaft. Now if the clutch coupling $k$ $k'$ be closed, the engine shaft will impart its motion to the shaft $b$ $b$, and this will give the "high speed." By releasing the coupling $k$ $k'$, and changing the lever $p$ to the notch $p''$, the speed of the shaft $b$ $b$ will be controllable by the manipulation of the lever 27, and its speed may be adjusted from near the highest to a barely observable motion; and the change is effected without jar, without noise, and with the greatest ease.

In giving motion to the crank-shaft a universal joint can be used instead of the angle-gearing $h$, or the transmission may be by spur-gearing.

Claims:

1. The combination in a speed changing device, of a frame having a vertical bearing, a movable head mounted in said bearing, a screw gearing and a lever for moving the head, vibrating heads on the sides of the movable head, a crank-shaft, levers upon which the vibrating heads are adapted to slide connected with the cranks on the crank-shaft, a driving shaft, said main shaft being in line with said driving shaft, rack loops connected to the upper ends of said levers inclosing the main shaft and sliding in bearings in the main frame, gear wheels with attached pulleys loosely mounted on the main shaft the said gear wheels engaging with the said racks, flanged sleeves fast to the main shaft the flanges extending within recesses in the sides of the said pulleys, dogs linked to the flanges with their outer ends inclosing the pulley rims, levers pivoted to the flanges, springs supported by said levers, said springs controlling said levers having extensions, sleeves arranged to slide on the flanged hubs, said levers being provided with diagonal slots to engage the extensions of the spring supporting levers, clutch levers arranged to operate together, a hand lever to operate the said clutch moving levers, and a notched arm support for the hand lever, all operating together to transform the speed of the driving shaft to a variable slower speed of the main shaft.

2. In a speed changing device a frame, a main shaft, a driving shaft, said main shaft being in line with the said driving shaft, a crank-shaft parallel with the main shaft and driven from the driving shaft, a vertical bearing, a head movable on said bearing, means comprising a screw and gears operative by a hand lever for moving said head, vibrating heads on the sides of the movable head, levers pivoted in the said vibrating heads, and connections uniting the said levers with the cranks on the crank-shaft, the upper ends of said levers having vertically-unchanging pivots reciprocating racks connected with said levers, means operated by said racks for rotating the shaft, the pivots of the vibrating heads being adjustable with respect to the rack connecting pivots in the upper ends of said levers.

3. In a speed changing device, reciprocating racks, rimmed pulleys operated by means of the said racks, a flanged hub on the shaft, a dog embracing the pulley rim linked to the said flange and adapted to pinch upon the said rim, a lever pivoted to the flange, a spring in the lever engaging with the outer end of the dog, a sleeve on said flanged hub adapted to slide but not to turn on the said hub and provided with a diagonal slot engaging the end of the spring supporting lever, and a lever adapted to slide the sleeve on the said hub.

4. The combination in a speed changing device as described, of a driving shaft, a main shaft, said main shaft being in line with the driving shaft, and a crank-shaft parallel with the main shaft and driven from the driving shaft, cranks on said crank shaft, connecting means comprising reciprocating racks for transmitting the motion of the crank shaft to the main shaft, and a coupling to connect the said driving and main shafts, a lever to operate said coupling, whereby the main shaft may be rotated directly from the driving shaft independently of the crank-shaft and the parts operated by the said crank-shaft.

Signed at Peekskill in the county of Westchester and State of New York this 15th day of August A. D. 1908.

PATRICK H. DOHERTY.

Witnesses:
JAMES DEMPSEY,
ROBT. JOHNS.